(12) United States Patent
Strasser

(10) Patent No.: US 9,174,072 B2
(45) Date of Patent: Nov. 3, 2015

(54) SELF-BELAY SET AS WELL AS A SYSTEM WITH BELAY POINTS

(76) Inventor: Philipp Strasser, Hinterbruehl (AT)

( * ) Notice: Subject to any disclaimer, the term of this patent is extended or adjusted under 35 U.S.C. 154(b) by 1339 days.

(21) Appl. No.: 12/311,858

(22) PCT Filed: Oct. 15, 2007

(86) PCT No.: PCT/AT2007/000481
§ 371 (c)(1),
(2), (4) Date: Oct. 12, 2010

(87) PCT Pub. No.: WO2008/049143
PCT Pub. Date: May 2, 2008

(65) Prior Publication Data
US 2011/0031065 A1     Feb. 10, 2011

(30) Foreign Application Priority Data
Oct. 23, 2006  (AT) .................... 1771/2006

(51) Int. Cl.
*A62B 35/00* (2006.01)
*A63B 29/02* (2006.01)
*E04G 21/32* (2006.01)
*F16B 45/02* (2006.01)

(52) U.S. Cl.
CPC ............. *A62B 35/0087* (2013.01); *A63B 29/02* (2013.01); *E04G 21/3261* (2013.01); *F16B 45/025* (2013.01)

(58) Field of Classification Search
CPC ..................................... A63B 29/02
USPC ....................... 182/3, 8, 9; 24/241
See application file for complete search history.

(56) References Cited

U.S. PATENT DOCUMENTS

| 2,116,880 | A |   | 5/1938  | Doe |
|-----------|---|---|---------|-----|
| 3,493,260 | A | * | 2/1970  | Smith .................. 294/82.33 |
| 3,698,048 | A | * | 10/1972 | Weman ................ 24/599.7 |
| 4,423,796 | A | * | 1/1984  | Sulowski et al. ........... 182/8 |

(Continued)

FOREIGN PATENT DOCUMENTS

| DE | 7919515    | 10/1979 |
| DE | 102005009946 | 7/2006 |

(Continued)

OTHER PUBLICATIONS

English Abstract of EP1832315.
(Continued)

*Primary Examiner* — Katherine Mitchell
*Assistant Examiner* — Candace L Bradford

(57) ABSTRACT

For the purpose of avoiding accidents during use, a self-belay set with two carabiners (K1 and K2) which can be hung at belay points (2) and which are each attached to a connection piece (6) attached to the self-belaying person, is characterized in that the blocking devices (15, 17) of the two carabiners (K1, K2) are coupled by a coupling means (7, 7), and characterized by a belay means (5) provided for the carabiners (K1, K2) which by means of the blocking device (15, 17) prohibits the carabiners from opening during the hanging of a carabiner (K1, K2) at the belay point (2) and during operation of the belay means (5). The blocking devices (17, 25) of the second carabiner (K1, K2) are operated via the coupling means (7, 7) in such a way that the second carabiner (K1, K2) is released for opening such that at all times only one of the carabiners (K1, K2) can be opened.

16 Claims, 7 Drawing Sheets

(56) References Cited

U.S. PATENT DOCUMENTS

| | | | |
|---|---|---|---|
| 4,528,728 A | | 7/1985 | Schmidt et al. |
| 4,694,931 A | * | 9/1987 | Sibertin-Blanc et al. ......... 182/3 |
| 5,927,431 A | * | 7/1999 | Klein, Jr. ........................ 182/3 |
| 5,964,316 A | * | 10/1999 | Roy ................................. 182/3 |
| 6,330,931 B1 | * | 12/2001 | Baillargeon et al. ............ 182/18 |
| 8,387,218 B2 | * | 3/2013 | Strasser ....................... 24/599.5 |
| 2002/0175024 A1 | | 11/2002 | Kurtgis |
| 2012/0205193 A1 | * | 8/2012 | Patel et al. ........................ 182/9 |
| 2013/0213735 A1 | * | 8/2013 | Dehondt et al. .................. 182/3 |

FOREIGN PATENT DOCUMENTS

| | | |
|---|---|---|
| DE | 102005009946 B3 * | 7/2006 |
| EP | 1832315 | 9/2007 |
| FR | 2483791 | 12/1981 |
| WO | 2004113745 | 12/2004 |

OTHER PUBLICATIONS

English Abstract of WO20044113745.
English Abstract of 102005009946.

* cited by examiner

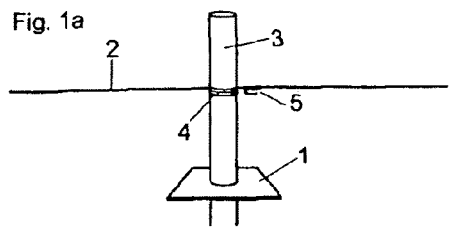
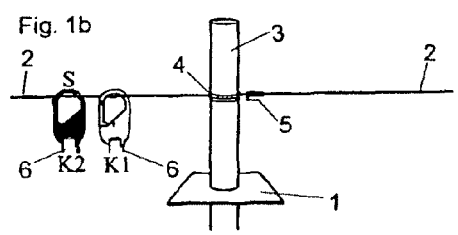
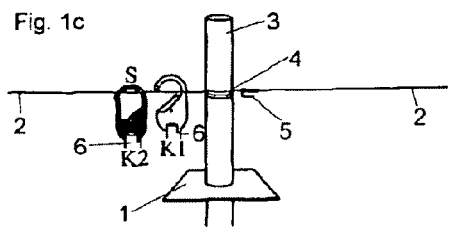
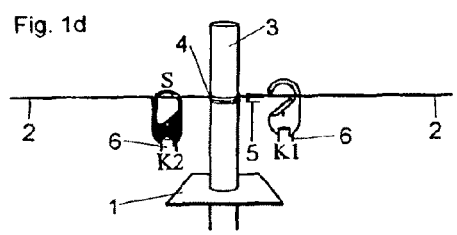
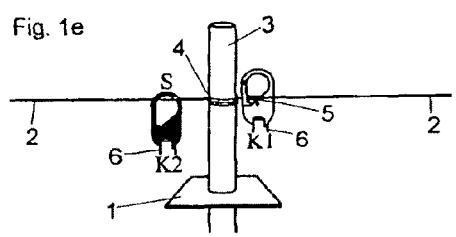
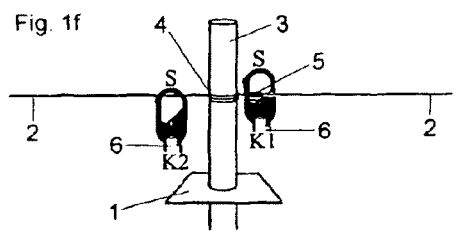
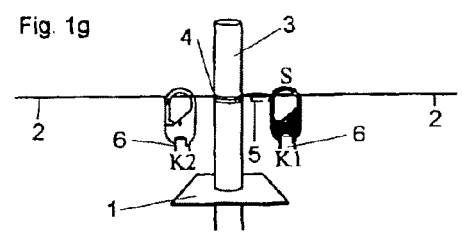
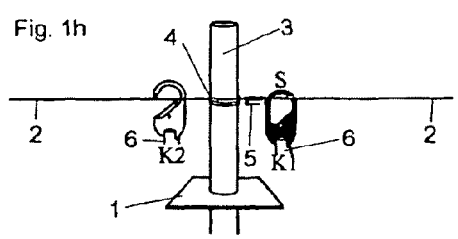
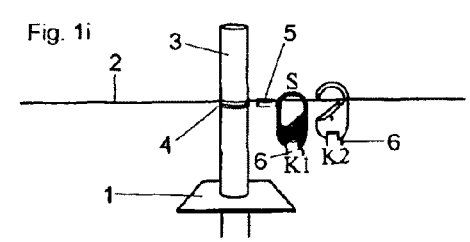
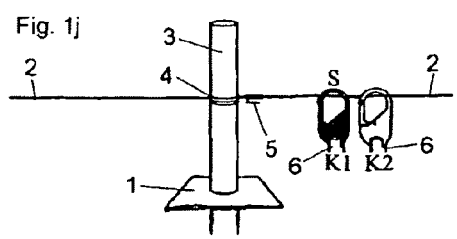

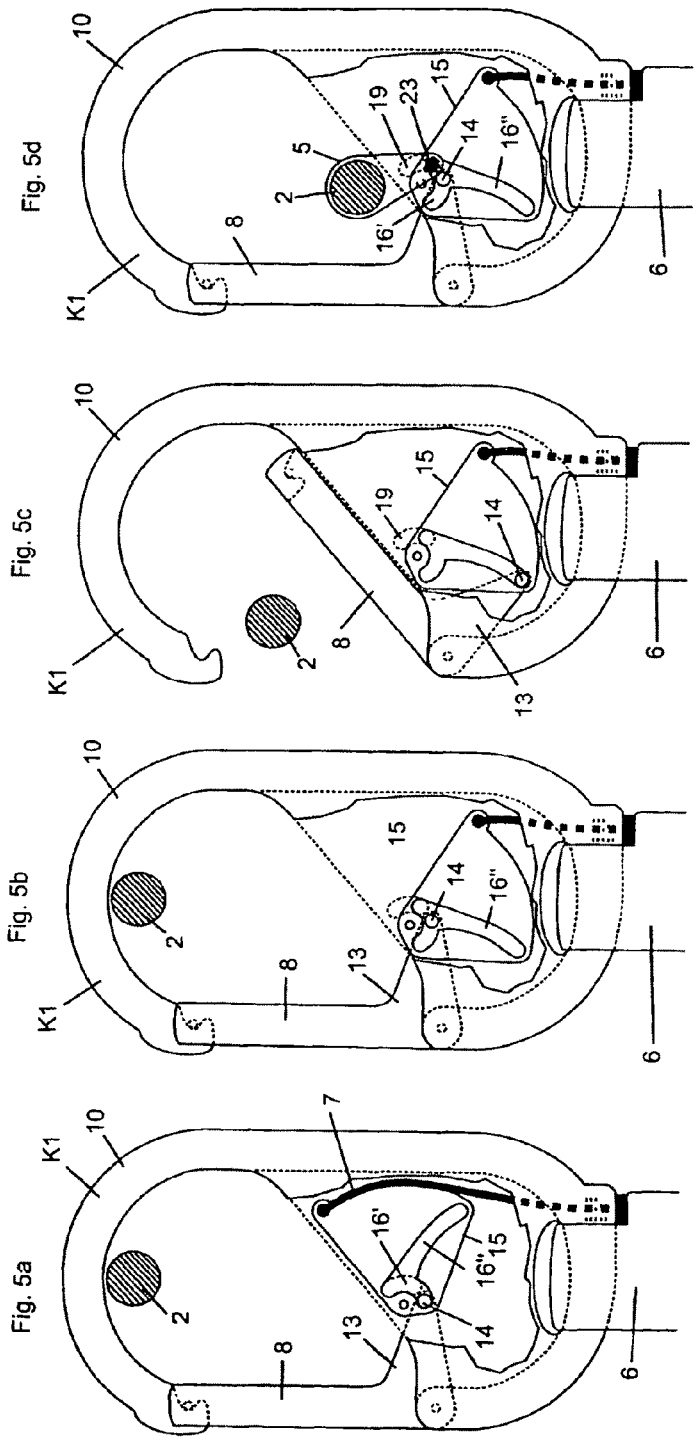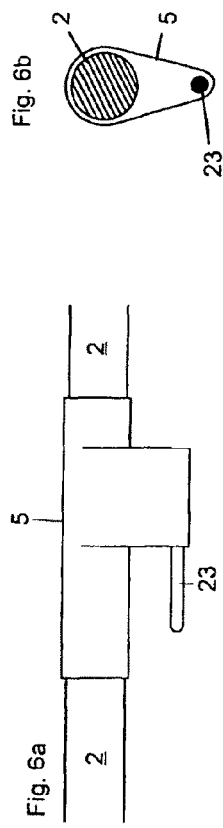

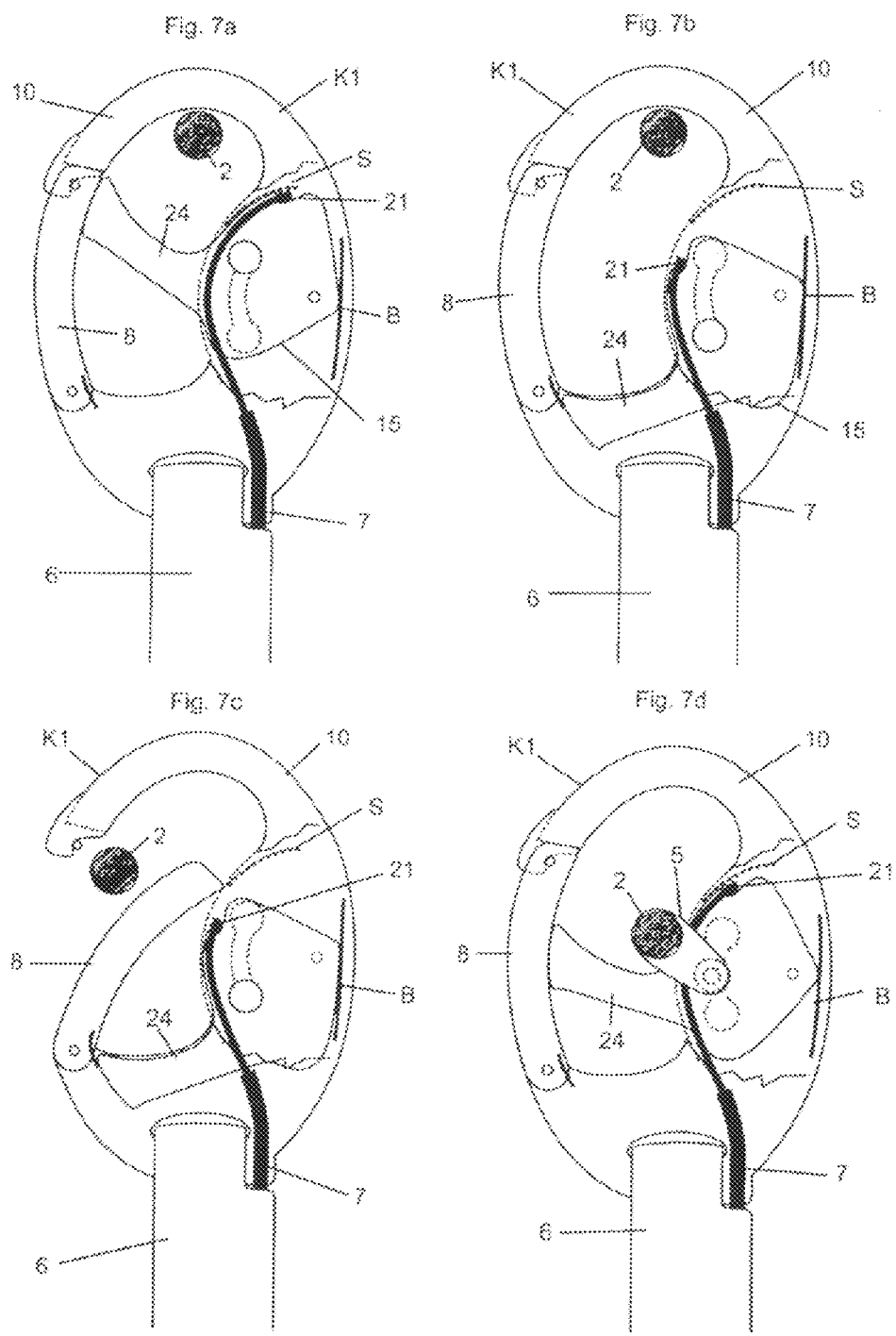

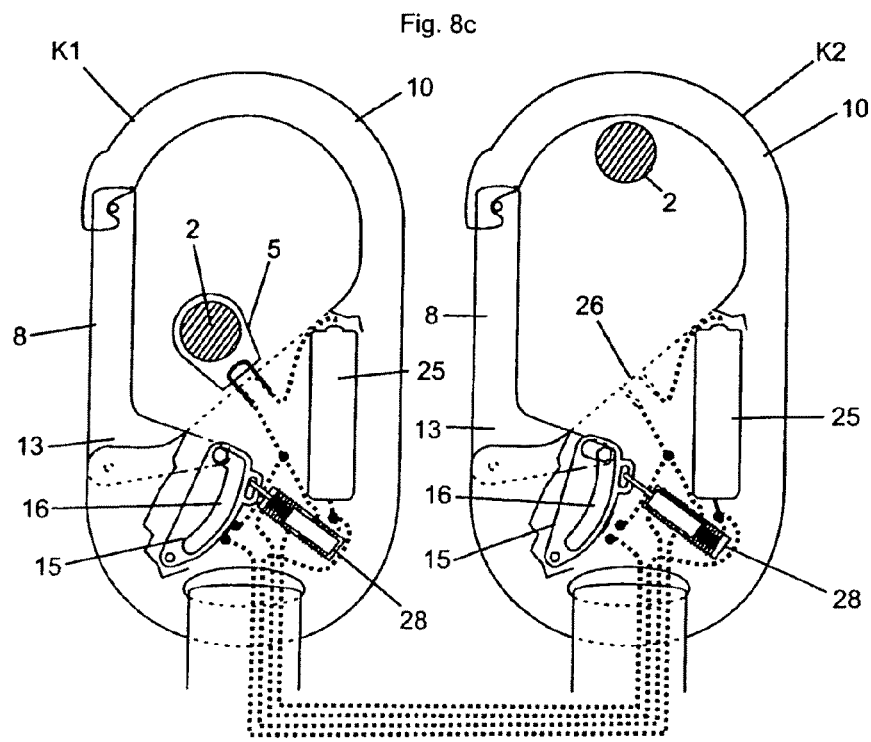
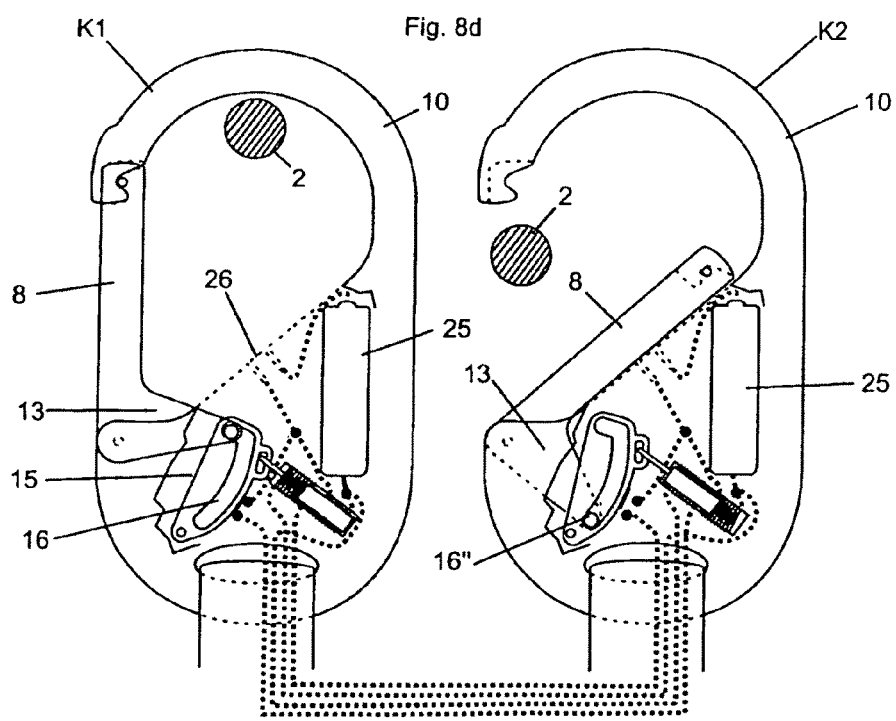

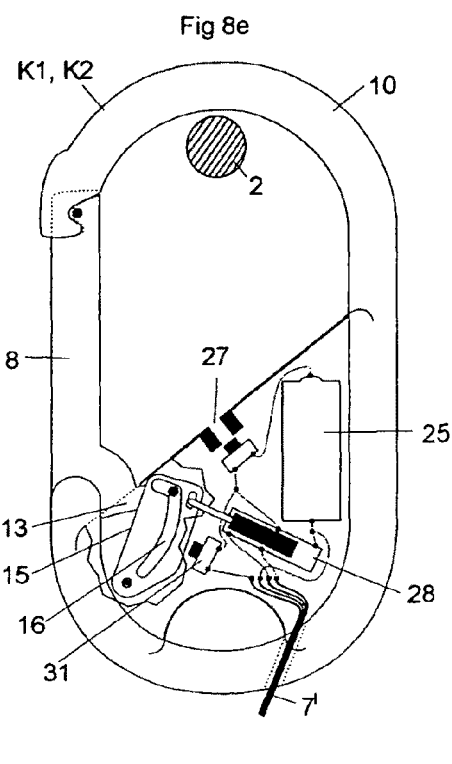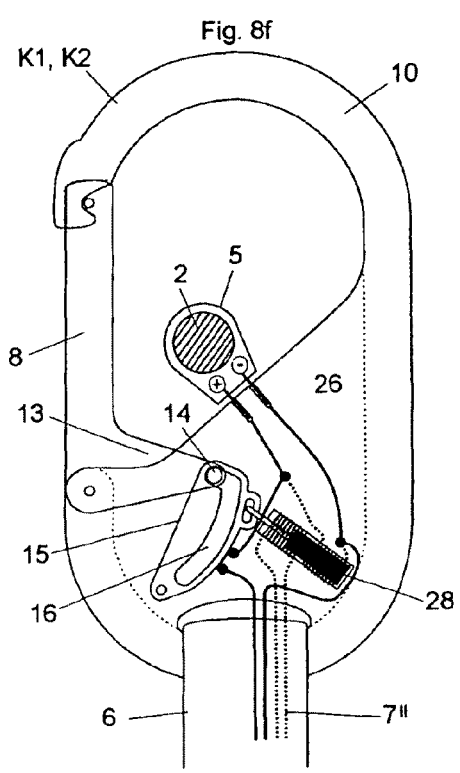

SELF-BELAY SET AS WELL AS A SYSTEM WITH BELAY POINTS

BACKGROUND OF THE INVENTION

Field of the Invention

The invention relates to a self-belay set with two carabiners which can be hung at belay points and which are each attached to a connection piece attached to the self-belaying person, as well as a system with two or more belay points.

THE PRIOR ART

A self-belay set of this kind is also known as a via ferrata set. Via ferrata sets are used for belaying climbers to so-called "secured" via ferratas or high rope courses. They are also used for exposed work on house facades, roofs, bridges, masts, etc. as well as in shipping, especially in sailboats. A self-belay set or via ferrata set usually comprises two carabiners which are each connected with the self-belaying person via a connection piece which is arranged as a rope or strap, e.g. a truss such as waist strap. The two carabiners are often fastened to the free ends of a Y-shaped or V-shaped rope or strap, which rope or strap is provided in the middle with an attachment apparatus for fastening to a truss of the self-belaying person.

The climber should always be connected with at least one carabiner to a preinstalled securing means (e.g. steel cable, ladder, bracket, etc.) on the via ferrata or the high rope course. The second carabiner is also either mounted, or it is opened in order to remount the same in deflections or interruptions of the preinstalled securing means, i.e. in the continuation of the preinstalled securing means, whereupon the first carabiner can also be mounted on the continuation of the preinstalled securing means.

This leads to the following problems:

Accidents occur repeatedly in using via ferrata sets which are caused by human error by the user. Especially children and untrained users are often the cause of improper use, especially due to nervousness caused by the height on high rope courses or on via ferratas, such as the simultaneous dismounting of both carabiners. This means an unsecured situation which in the worst case can lead to the user falling from large heights.

The invention intends to avoid these disadvantages and has the object of providing a self-belay set of the kind mentioned above with which it is possible to securely prevent improper handling, so that the likelihood of falling reliably cannot occur, even in cases when persons having no knowledge of belaying or climbing such as children use the self-belay set.

SUMMARY OF THE INVENTION

This object is achieved in accordance with the invention by a self-belay set of the kind mentioned above in such a way that
  the blocking apparatuses of the two carabiners are coupled by means of a coupling means;
  a belay means for the carabiners is provided which upon mounting a carabiner in the belay point and upon actuating the belay means blocks the same against opening by means of the blocking apparatus;
  with the blocking apparatuses of the second carabiner being actuated via the coupling means in such a way that the second carabiner is released for opening, so that at all times only one of the carabiners can be opened.

According to the state of the art, merely individual carabiners are known which can be blocked against inadvertent opening, among others from WO 2004/113745 A1, from which an embodiment is known in which a carabiner has a blocking device which can be moved to a release position for remote unlocking by a cord. According to U.S. Pat. No. 2,116,880 A, the blocking of the carabiner can be released by a key rod. FR 2 483 781 Al describes a snap hook which is additionally opened by spring force. DE 79 19 515 U1 further discloses a locking hook with remote opening which can be activated via a Bowden cable. U.S. 4,528,728 A describes different blocking apparatuses for individual snap hooks.

According to a preferred embodiment of the invention, the two carabiners are mechanically coupled.

An especially light embodiment is characterized in that the two carabiners are electrically coupled or in such a way that the two carabiners are coupled via radio.

A further embodiment which makes do without any mechanical coupling is wherein the two carabiners are hydraulically coupled.

A key fastened to the belay point can be used as a belay means. It is also possible to provide belay means that act electrically, electronically, magnetically or inductively. It is further also possible to use optically acting belay means.

A system with two or more securing points is characterized in that the belay points are equipped with belay means which cooperate with a self-belay set, with preferably the belay points being formed by cables, brackets, ladders or hand-rails fastened to fixed points. In order to ensure belaying even over larger distances, it is appropriate to arrange adjacent belay points in reachable distance from each other.

BRIEF DESCRIPTION OF THE DRAWINGS

The invention is explained below in greater detail by reference to a number of embodiments, wherein
  FIGS. 1a to 1j explain the principle underlying the invention in greater detail,
FIG. 6a illustrates a key in a side view,
FIG. 6b illustrates a front view,
FIGS. 7a to 7d illustrate another embodiment,
and
  FIGS. 8a to 8f illustrate the cooperation of two carabiners by an electric signal.

DETAILED DESCRIPTION OF THE DEPICTED EMBODIMENTS

Figure 2:
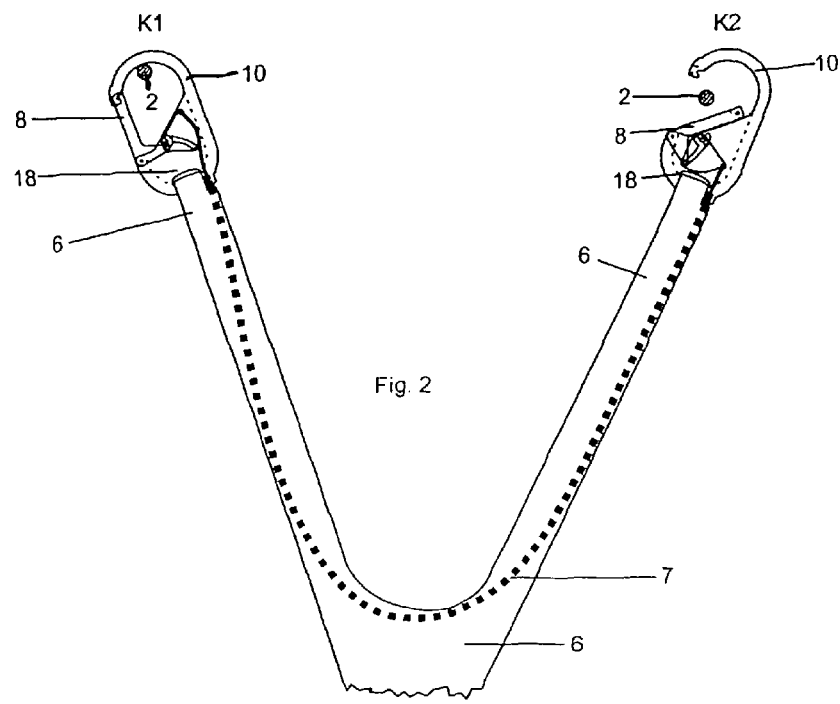
FIG. 2 shows a self-belay set in a schematic illustration according to a first embodiment.

The following description is used for explaining the handling of a self-belay set in accordance with the invention, relating to FIGS. 1a to 1j. These drawings show a platform 1 of a high rope course, with a cable such as a steel cable 2 being tensioned from mast 3 to mast 3. The steel cable 2 is fastened to each mast 3, e.g. with a winding 4, and is used as a belay point for securing a person from falling. Slightly adjacent to the mast 3 there is a key 5 for locking and unlocking two carabiners K1 and K2 of a self-belay set, with each of the carabiners K1 and K2 being connected via a connection piece 6 with a person to be belayed. As is illustrated in FIG. 2, this connection piece 6 can be formed by a Y-shaped belay sling 6 for example. Both carabiners K1 and K2 are coupled by means of a coupling means 7, with the coupling means 7 always releasing only one of the two carabiners K1 or K2 for opening and holding the second one in the locked position.

These coupling means 7 can be of different configuration, as will be described further below.

In FIG. 1 the carabiner K1 or K2 which is blocked against opening is designated with S and shown in black. According to FIG. 1b, the belayed person moves along the steel cable 2 up to a platform 1 enclosing the mast 3, with the carabiner K2 being blocked against opening and carabiner K1 not being blocked but still being locked. Both carabiners K1 and K2 are mounted on the steel cable 2.

FIG. 1c shows the opening of carabiner K1 which is subsequently mounted on steel cable 2, as is shown in FIG. 1d, which continues from mast 3 to a further mast. As is shown in FIG. 1e, carabiner K1 is blocked by means of key 5, through which carabiner K1 is secured against opening. For a short time, both carabiners K1 and K2 are locked during the locking (FIG. 1f). Towards the end of the locking process of carabiner K1, carabiner K2 is unlocked via the coupling means 7 and carbiner K2 can be opened, as shown in FIG. 1h, and can also be mounted on the steel cable 2 leading away from the mast 3 (cf. FIG. 1i).

Subsequently, the belayed person can continue to move from platform 1 along the steel cable 2. He or she is now completely secured against falling by the now locked carabiner K1. As is shown from the above description, it is not possible that the belayed person is not belayed for even a moment during the remounting process by lack of attention or mishandling. One of the carabiners K1 or K2 is always secured against opening, i.e. it is blocked.

FIG. 2 illustrates a mechanical coupling of the two carabiners K1 and K2 by means of a Bowden cable 7 which is loosely built into the belay sling 6, so that in the case of a fail of the belayed person or the occurrence of another tensile load on the belay sling 6 which is caused for other reasons only the belay sling 6 will be loaded, but not the Bowden cable 7.

Figures 3, 4:
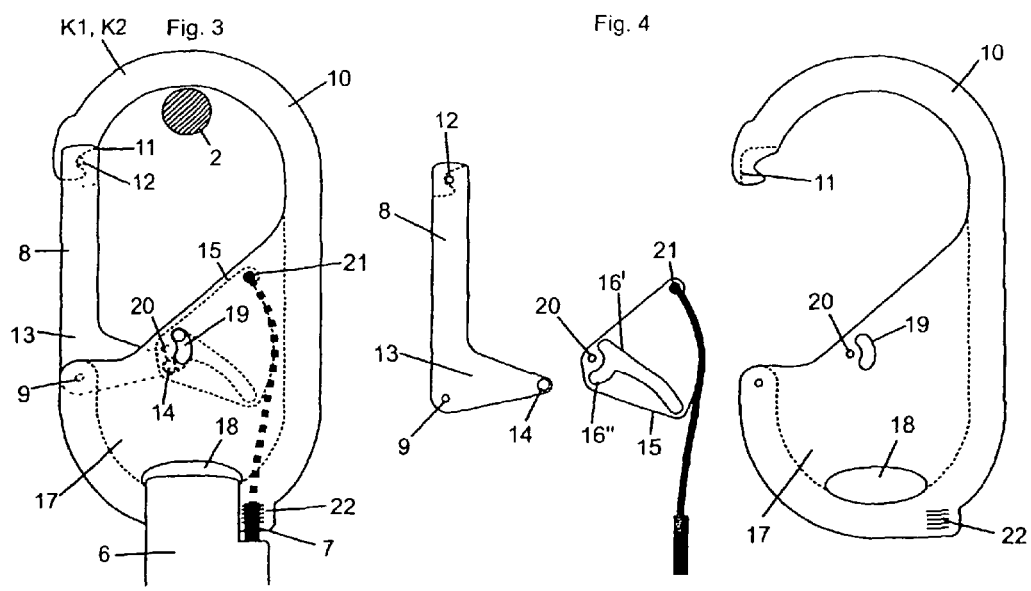
FIG. 3 shows an illustration of a carabiner.
FIG. 4 illustrates its individual parts,
  FIGS. 5a to 5d explains the function of the carabiner.

The arrangement of a carabiner K1 and K2 is shown in FIGS. 3 and 4. The catch 8 of the carabiner is hinged in a conventional way via a pivot axis 9 on the carabiner body 10, with latching of the freely movable end of catch 8 on the carabiner body being possible in the closed state, e.g. by means of notch 11 on the carabiner body 10 and a counterpart 12 latching into the notch 11, e.g. arranged as a pin 12 for example.

Catch 8 comprises a projection 13 which extends towards the carabiner body 10 and which is coupled by means of a guide pin 14 with a blocking apparatus 15, engaging in a groove 16 or a slit in the blocking apparatus 15, along which groove (or slit) said guide pin 14 can be moved depending on the position of the blocking apparatus 15, thus allowing the catch 8 to be opened or to be blocked against opening, depending on the position of the blocking apparatus 15. The groove 16 or slit comprises two arched branches 16' and 16" which are arranged at an angle with respect to each other. The carabiner body 10 is provided with a housing 17 which partly closes the space enclosed by the carabiner body 10 and which comprises an eye 18 for a belay sling, i.e. the connection piece 6, leading to the person to be belayed. The blocking apparatus 15 is pivotably fastened to the housing 17 via an axis 20. Furthermore, the housing 17 comprises a keyhole 19 which is in alignment with the branch 16' or the groove 16.

The blocking apparatus 15 is further connected with the Bowden cable 7 via a fastening cam 21. The carabiner body 10 further comprises an adjusting apparatus 22 such as a thread with counternut in order to enable setting the Bowden cable 7 to its correct length for the purpose of cooperation with the second carabiner of the same configuration. FIG. 3 further illustrates the steel cable 2 extending in the carabiner.

The function of two cooperating carabiners K1 and K2 is illustrated below by reference to FIGS. 5a to 5d.

In accordance with FIG. 5a, carabiner K1 is in the closed state and the blocking apparatus 15 prevents an opening of the catch 8 in the position as shown in FIG. 5a, since sliding of the guide pin 14 into the branch 16" of groove 16 is not possible by merely moving the catch 8. Guide pin 14 is disposed in the branch 16' of groove 16. The opening of the carabiner would only be possible if the second carabiner K2 which belongs to the self-belay set and which is in the unlocked state at this point in time (as shown in FIG. 5b) would be locked.

FIG. 5b shows the carabiner K1 in the unlocked state. Catch 8 can be opened (as shown in FIG. 5c) by allowing the guide pin 14 to slide along the branch 16" of groove 16, so that carabiner K1 can be dismounted from the steel cable 2. Any locking, i.e., blocking against opening, as shown in FIG. 5d, is only possible when the key 5 which is fastened to steel cable 2 and has a closing pin 23 which can be guided through the keyhole 19 performs a relative moment against the carabiner K1, according to which the blocking apparatus 15 is moved again from the position shown in FIG. 5d to the position shown in FIG. 5a. This can only be performed after the mounting of carabiner K1 into the steel cable 2 having the key 5. It is only then that the closing pin 23 of key 5 can be inserted into the keyhole 19 and into the point of intersection of branches 16' and 16" of groove 16 or the slit of the blocking apparatus 15, whereupon the carabiner K1 needs to be moved against the key 5 for the purpose of unlocking the second carabiner K2 until the blocking apparatus 15 is moved by means of the closing pin 23 to the position as shown in FIG. 5a. The Bowden cable 7 transmits the movement of the blocking apparatus 15 of carabiner K1 onto the blocking apparatus 15 of the other carabiner K2 and thus produces a diametrically opposed movement of the same.

With the help of key 5, via ferratas or high rope courses can be regulated in such a way as such a key 5 is provided on only one side of each section of the high rope course or via ferrata. It is further possible to provide different keys 5, so that with a specific self-belay set certain sections of a high rope course cannot be accessed, e.g. such that the diameter of the closing pin 23 of the key 5 is dimensioned in such a way that it only fits into keyholes 19 of carbines K1 and K2 of certain self-belay sets.

FIGS. 7a to 7d show the function of a carabiner K1 which is also coupled by means of a Bowden cable 7 with a carabiner K2, with carabiner K1 having a variant of a blocking apparatus 15 however which is provided with a blocking projection 24 which can be moved from a position blocking the catch 8, as shown in FIG. 7a, to a position releasing the catch 8 to an opening movement, as shown in FIG. 7b, which occurs by pivoting the blocking apparatus 15, with the Bowden cable 7 bringing the carabiner K2 which is coupled with carabiner K1 in a diametrically opposed way to a position enabling the opening or a closing position, which occurs, by moving the blocking apparatus 15 of the carabiner K2 in a diametrically opposed way to the movement of the blocking apparatus 15 of carabiner K1.

A leaf spring B ensures that the blocking apparatus 15 remains in its end positions, which are shown in the FIGS. 7a, 7b and 7c.

FIG. 7d shows the use of key 5 after the mounting of the carabiner in the cable, which is illustrated in FIG. 7c.

In order to prevent an opening of a blocked carabiner by means of the blocking projection 24, a lock S which is arranged as a toothed band is provided, into which engages the fastening cam 21 with a counter-toothing. The toothed joint can only be released by a pulling motion of the Bowden cable 7.

Instead of the mechanical coupling means 7 as described above, it would also be possible to provide electrically driven coupling means 7' for communication between the carabiners K1 and K2. Such variants require power supply of the self-belay set. The advantage of such an electric coupling of the carabiners K1 and K2 is that the connection between carabiners K1 and K2 can be laid as a flexible multi-pole cable 7', through which the connection piece 6 can be handled with more ease and is less sensitive. FIGS. 8a to 8d show two carabiners K1 and K2 each of a self-belay set, with the electric coupling being illustrated by means of the dotted line.

Figure 8A:
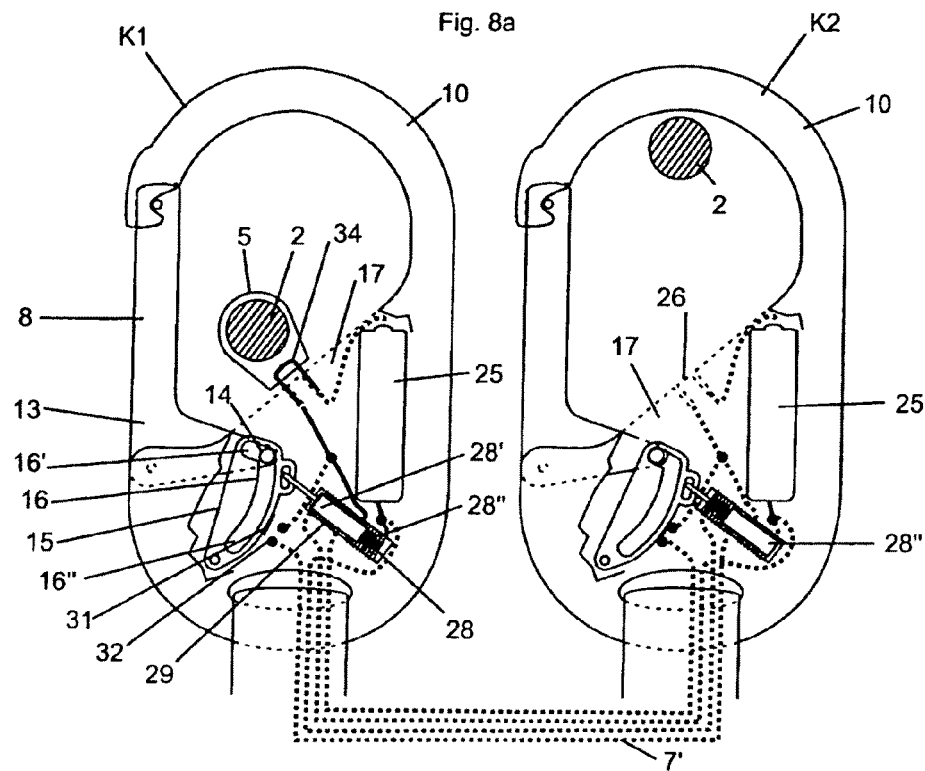
Figure 8B:
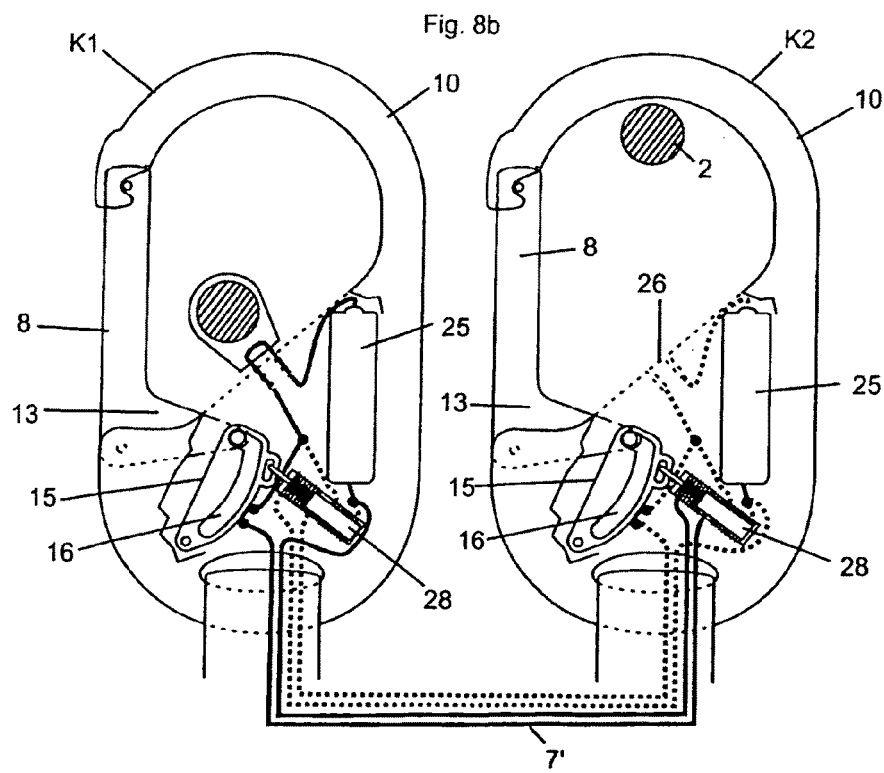

A battery 25 is provided in the housing 17 of carabiner body 10, which battery is coupled with a double coil 28, which is formed by coils 28' and 28" and in which an iron core 29 is axially displaceable, via a socket outlet 26 which is provided in the housing 17 of the carabiner body 10 or via a switch 27 according to a variant illustrated in FIG. 8e, which otherwise is identical with the variant according to FIG. 8a. Said iron core 29 is connected via a pushrod 30 with the blocking apparatus 15, so that said blocking apparatus 15 can be moved from an opened position as shown in FIG. 8a for carabiner K1 to a locked position as shown in FIG. 8a for carabiner K2.

A projection 13 of catch 8 is guided with a guide bolt 14 in a groove 16 or a slit of the blocking apparatus 15, similar to the embodiment as shown in FIGS. 3 and 4. A contact point 31 for closing a switch 32 is provided on the blocking apparatus 15. The key 5 is provided with a plug 34 which short-circuits the socket outlet 26, whereupon the piston 5 is moved into coil 28" into the position shown in FIG. 8b for carabiner K1, which occurs by entraining the blocking apparatus 15, through which said carabiner K2 is blocked against opening. By closing the switch 32 by means of blocking apparatus 15 in carabiner K1, current flows to the coil 28' of carabiner K2, whereupon its piston 29 is moved to the coil 28' and the blocking apparatus is moved to the release position, in which the guide pin of the catch can be moved along branch 16" of groove 16 or the slit for opening carabiner K2. This position illustrated in FIG. 8c for carabiner K2. Switch 32 of carabiner K2 is opened here. As is illustrated in FIG. 8d, carabiner K2 can be taken from the steel cable 2 and can be mounted in the next section of steel cable 2.

FIG. 8f shows an embodiment, according to which power supply of the carabiners K1 and K2 occurs via the key 5 which is connected to a central power supply point such as the cabling of ail keys in a high rope course, or a decentralized power supply point such as a solar power unit or a battery or a rechargeable battery. This embodiment works principally the same as the one shown in FIG. 8a.

As already mentioned, the self-belay set in accordance with the invention can be used not only for via ferratas and high rope courses, but also for inspecting exposed positions on structures such as high-rise buildings, masts, bridges, etc., e.g. for repair and/or service work, and on ships and in space. The fields of application for the self-belay set in accordance with the invention are explained below in closer detail:

High Rope Courses

The continuously belayed self-belay set allows maximum security for participants on high rope courses. This allows the participant to concentrate fully on the exercises and less on the person's own safety.

The problem of belaying children and belaying inexperienced participants is thus solved, which also provides relief to the trainers.

Overtaking and passing one another in opposite directions is possible at all points with keys. It is possible to branch off at any time. Any number of rope exercises can start or end on any platform. The system further offers the possibility of telematic control of participants in the high rope course.

Existing self-belay high rope courses can be retrofitted with little effort for the use of the continuously belayed self-belay set.

Via Ferratas

The continuously belayed self-belay set offers the possibility for via ferratas to allow larger groups such as school classes to climb with relatively little supervision.

The climber mounts the carabiner at the beginning of the via ferrata, uses it until the end and can unlatch only at the end of the same.

Overtaking or passing in opposite directions is possible at all points with keys. The self-belaying self-belay set can be used to walk along steel cables as well as on ladders and other climbing aids.

Leaving and entering the system again is possible, e.g. when a via ferrata is not consistently equipped with steel cables and other aids.

Existing self-belay via ferratas can be retrofitted with little effort for the use of the continuously belayed self-belay set.

Securing Buildings

Outside work on buildings such as the maintenance of wind power plants, window cleaning on high-rise buildings or even renovation work is often carried out without the help of a scaffold. The working persons are therefore secured with ropes. In addition to the main work, which is the renovation or repairs, the working persons also need to have climbing or belaying skills. By concentrating on the actual work, security is often neglected and accidents consequently happen.

The consistently belayed self-belay set renders impossible any inadvertent release of the belaying during the work.

Existing buildings can be equipped easily with keys. The system can be prepared without any major effort for new buildings.

Belaying Astronauts and Space Tourists

The consistently secure self-belay set can be used not only for climbing, but also for belaying in completely different areas, right up to belaying astronauts outside of a spaceship.

Belaying on Boats and Ships

Belaying persons with a belt and carabiner is common practice on boats and ships, especially in the case of bad weather. The consistently secure self-belay set can offer more security here.

Possibilities of telematic control concerning the use of high rope courses are described below:

Problem of Process Organization in High Rope Courses

When several exercises are offered in a combined way in high rope courses, there are several types of arranging the various elements:

Arrangement on a circular course
    Star-like arrangement
    Chaotic arrangement It needs to be ensured both on the trainer's side as well as the participant's side that capacities (stress limits) of the platforms and the exercises are not exceeded. A frequent problem is the different speed of the participants during the various exercises or the (intention of) overtaking of the participants by one another. It also frequently occurs that participants wish to perform attractive exercises several times.

The trainers are challenged both with respect to security as well as organization.

Automatic Control by the Consistently Secured Self-Belay Set

The direction of the participants can be influenced by providing a purposeful arrangement of the keys for the consistently secured self-belay set. An exercise can only be entered on the side on which a key is mounted.

The various keys allow guiding different participants on different paths through the high rope course. It can be controlled that children can only access easy exercises at a low high, but that good climbers can access all exercises with their key.

The same applies in an analogous manner to conventional via ferratas, which are retrofitted for consistent belaying by mounting keys.

Control by the Consistently Secured Self-Belay Set with Labelled Keys, Radio Transmission and Computers There is a possibility to provide the keys 5 with information content by chips or optical scanning (similar to EAN codes). Carbines K1 and K2 thus always know where they are located.

When a carabiner is equipped with a radio system (e.g. Bluetooth), they can not only communicate with each other, but can also transmit this information in this way to a computer.

With the help of this control system, the following possibilities can be realized automatically or by intervention of a trainer in the computer program:

Blocking of exercises

Blocking the entire course (e.g. in the case of an accident)

Preventing new participants from entering and merely allowing access in the direction towards the exit (e.g. at the end of service)

Control as to how many participants are permitted in an exercise

Control as to the direction the exercises may take

Permitting or prohibiting overtaking manoeuvres

Billing according to time of use

Billing according to time and number of completed exercises

Determination of the total number of users in exercises in order to determine the time of next service Determination of the attractiveness of the exercise, in order to consider this in changes made to the high rope course The invention is not limited to the embodiments as described above, but it can be modified in various ways, e.g. so-called "FROGS" can be used instead of the carabiner.

The key can further comprise the following forms:

Optical with laser scanning: The carabiner recognizes by means of laser scanning of a code at a secure point (e.g. steel cable) that it is located at a secure point.

Computer chip: The carabiner recognizes through a smart or non-smart chip at a secure point (e.g. steel cable) that it is located at a secure point.

Inductive: The steel cable is used as the iron core of an induction process. This comes with the advantage that no key needs to be applied, and the steel cable can be used as the key. Any triggering of the induction process by other metallic objects (e.g. keyring, pocket knife) must be prevented.

Magnetic: The steel cable is used as an iron core and thus attracts a magnetic blocking apparatus in its direction. This solution allows avoiding the application of a key to the steel cable and is thus also suitable for unprepared via ferratas or high rope courses.

The invention claimed is:

1. A self-belay set comprising a first carabiner and a second carabiner which are each mountable at belay points, wherein each of the first carabiner and the second carabiner is blockable by means of a respective blocking apparatus and wherein each of the first and the second carabiner is attached to a connection piece attachable to a self-belaying user, and further comprising a coupling means for interconnecting the blocking apparatuses of the first and second carabiners;

a locking means for the first and second carabiners which upon mounting the first carabiner in the belay point and upon actuating the locking means will block the first carabiner from opening via the associated blocking apparatus;

the blocking apparatus of the second carabiner being actuated via the coupling means to release the second carabiner for opening, so that at all times only one of the first carabiner or the second carabiner is openable, and wherein the locking means is a key fastened to the belay point;

wherein the key is provided separately from the first carabiner and the second carabiner.

2. The self-belay set according to claim 1, wherein the coupling means consists of a mechanical coupling means.

3. The self-belay set according to claim 1, wherein the coupling means consists of an electric coupling means.

4. The self-belay set according to claim 1, wherein the coupling means consists of a radio coupling means.

5. The self-belay set according to claim 1, wherein the coupling means consists of a hydraulic coupling means.

6. A system with two or more belay points and at least one self-belay set according to claim 1, said two or more belay points each including a said locking means.

7. The system according to claim 6, wherein the belay points are formed by ropes, brackets, ladders or hand-rails fastened to fixed points.

8. The system according to claim 7, wherein adjacent belay points are arranged within a user's reachable distance of one another.

9. The self-belay set according to claim 1, wherein the locking means comprises a mechanical locking means.

10. The self-belay set according to claim 1, wherein the locking means comprises an electrical locking means.

11. The self-belay set according to claim 1, wherein the locking means comprises an electronic locking means.

12. The self-belay set according to claim 1, wherein the locking means comprises a magnetic or inductive locking means.

13. The self-belay set according to claim 1, wherein the locking means comprises a optical acting locking means.

14. A self-belay set comprising two carabiners which are hangable at belay points, which are blockable by means of a blocking apparatus and which are each attached to a connection piece attachable to a self-belaying user, and further comprising:

a coupling means which couple the respective blocking apparatuses of the two carabiners;

a locking means for the carabiners which upon mounting one of the two carabiners in the belay point and upon actuating the locking means, blocks a first of the two carabiners from opening by means of the blocking apparatus; and wherein the locking means is a key fastened to the belay point;

wherein the key is provided separately from the first carabiner and the second carabiner;

the respective blocking apparatuses of a second of the two carabiners being actuated via the coupling means in such a way that the second carabiner is released for opening, so that at all times only one of the first and second carabiners is operable.

15. The self-belay set according to claim 14, wherein the coupling means is selected from the group consisting of:
   a mechanical coupling means,
   an electrical coupling means,
   a radio coupling means, and
   a hydraulic coupling means.

16. The self-belay set according to claim 14, wherein the locking means is selected from the group consisting of:
   a mechanical locking means,
   an electrical locking means,
   an electronic locking means,
   a magnetic locking means,
   an inductive locking means, and
   an optical locking means.

\* \* \* \* \*